US009270566B2

(12) United States Patent
Wang et al.

(10) Patent No.: US 9,270,566 B2
(45) Date of Patent: Feb. 23, 2016

(54) MONITORING SERVER LOAD BALANCING

(75) Inventors: Bing Wang, San Jose, CA (US); David Cheung, Cupertino, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 289 days.

(21) Appl. No.: 13/584,534

(22) Filed: Aug. 13, 2012

(65) Prior Publication Data

US 2013/0173784 A1 Jul. 4, 2013

Related U.S. Application Data

(63) Continuation of application No. 11/937,285, filed on Nov. 8, 2007, now Pat. No. 8,248,928.

(60) Provisional application No. 60/998,410, filed on Oct. 9, 2007.

(51) Int. Cl.
| G01R 31/08 | (2006.01) |
| H04L 12/26 | (2006.01) |
| H04L 29/06 | (2006.01) |
| H04L 12/803 | (2013.01) |
| H04L 29/08 | (2006.01) |

(52) U.S. Cl.
CPC .......... *H04L 43/0894* (2013.01); *H04L 43/026* (2013.01); *H04L 43/12* (2013.01); *H04L 47/125* (2013.01); *H04L 63/1408* (2013.01); *H04L 67/1014* (2013.01)

(58) Field of Classification Search
USPC .............. 370/230–240, 241, 241.1, 253, 389, 370/390, 396, 395.41, 395.43, 395.5, 419, 370/428, 479
See application file for complete search history.

(56) References Cited

U.S. PATENT DOCUMENTS

| 5,031,094 A | 7/1991 | Toegel et al. |
| 5,359,593 A | 10/1994 | Derby et al. |
| 5,948,061 A | 9/1999 | Merriman et al. |
| 5,951,634 A | 9/1999 | Sitbon et al. |
| 6,006,269 A | 12/1999 | Phaal |
| 6,006,333 A | 12/1999 | Nielsen |

(Continued)

FOREIGN PATENT DOCUMENTS

| EP | 2654340 A1 | 10/2013 |
| IE | 2007/0438 A1 | 2/2008 |
| WO | 2010/135474 A1 | 11/2010 |

OTHER PUBLICATIONS

IBM User Guide, Version 2.1 AIX, Solaris and Windows NT, Third Edition (Mar. 1999) 102 Pages.

(Continued)

*Primary Examiner* — Jung-Jen Liu
(74) *Attorney, Agent, or Firm* — Kilpatrick Townsend & Stockton LLP

(57) ABSTRACT

Embodiments described herein discuss an approach to implementing load-balancing across multiple monitoring servers. One such embodiment describes a network monitoring device. The network monitoring device includes an ingress port, for receiving mirrored network packets, and a number of egress ports. The egress ports are associated with a number of monitoring servers, and used to forward the mirrored network packets to the monitoring servers. A packet classifier, coupled to the ingress port, examines the mirrored network packets, and determines which of the monitoring servers should receive the packets.

25 Claims, 9 Drawing Sheets

Network 100

(56) References Cited

U.S. PATENT DOCUMENTS

| | | |
|---|---|---|
| 6,092,178 A | 7/2000 | Jindal et al. |
| 6,112,239 A | 8/2000 | Kenner et al. |
| 6,115,752 A | 9/2000 | Chauhan |
| 6,128,279 A | 10/2000 | O'Neil et al. |
| 6,128,642 A | 10/2000 | Doraswamy et al. |
| 6,148,410 A | 11/2000 | Baskey et al. |
| 6,167,445 A | 12/2000 | Gai et al. |
| 6,167,446 A | 12/2000 | Lister et al. |
| 6,182,139 B1 | 1/2001 | Brendel |
| 6,195,691 B1 | 2/2001 | Brown |
| 6,205,477 B1 | 3/2001 | Johnson et al. |
| 6,233,604 B1 | 5/2001 | Van Horne et al. |
| 6,260,070 B1 | 7/2001 | Shah |
| 6,286,039 B1 | 9/2001 | Van Horne et al. |
| 6,286,047 B1 | 9/2001 | Ramanathan et al. |
| 6,304,913 B1 | 10/2001 | Rune |
| 6,324,580 B1 | 11/2001 | Jindal et al. |
| 6,327,622 B1 | 12/2001 | Jindal et al. |
| 6,336,137 B1 | 1/2002 | Lee et al. |
| 6,381,627 B1 | 4/2002 | Kwan et al. |
| 6,389,462 B1 | 5/2002 | Cohen et al. |
| 6,427,170 B1 | 7/2002 | Sitaraman et al. |
| 6,434,118 B1 | 8/2002 | Kirschenbaum |
| 6,438,652 B1 | 8/2002 | Jordan et al. |
| 6,446,121 B1 | 9/2002 | Shah et al. |
| 6,449,657 B2 | 9/2002 | Stanbach, Jr. et al. |
| 6,470,389 B1 | 10/2002 | Chung et al. |
| 6,473,802 B2 | 10/2002 | Masters |
| 6,480,508 B1 | 11/2002 | Mwikalo et al. |
| 6,490,624 B1 | 12/2002 | Sampson et al. |
| 6,549,944 B1 | 4/2003 | Weinberg et al. |
| 6,567,377 B1 * | 5/2003 | Vepa et al. .................... 370/230 |
| 6,578,066 B1 | 6/2003 | Logan et al. |
| 6,606,643 B1 | 8/2003 | Emens et al. |
| 6,665,702 B1 | 12/2003 | Zisapel et al. |
| 6,671,275 B1 | 12/2003 | Wong et al. |
| 6,681,232 B1 | 1/2004 | Sitanizadeh et al. |
| 6,681,323 B1 | 1/2004 | Fontsnesi et al. |
| 6,691,165 B1 * | 2/2004 | Bruck et al. .................. 709/227 |
| 6,697,368 B2 | 2/2004 | Chang et al. |
| 6,735,218 B2 | 5/2004 | Chang et al. |
| 6,745,241 B1 | 6/2004 | French et al. |
| 6,751,616 B1 * | 6/2004 | Chan ................................ 707/8 |
| 6,772,211 B2 | 8/2004 | Lu et al. |
| 6,779,017 B1 | 8/2004 | Lamberton et al. |
| 6,789,125 B1 | 9/2004 | Aviani et al. |
| 6,826,198 B2 | 11/2004 | Turina et al. |
| 6,831,891 B2 | 12/2004 | Mansharamani et al. |
| 6,839,700 B2 | 1/2005 | Doyle et al. |
| 6,850,984 B1 | 2/2005 | Kalkunte et al. |
| 6,874,152 B2 | 3/2005 | Vermeire et al. |
| 6,879,995 B1 | 4/2005 | Chinta et al. |
| 6,898,633 B1 | 5/2005 | Lyndersay et al. |
| 6,901,072 B1 | 5/2005 | Wong |
| 6,901,081 B1 | 5/2005 | Ludwig |
| 6,928,485 B1 | 8/2005 | Krishnamurthy et al. |
| 6,944,678 B2 * | 9/2005 | Lu et al. ........................ 709/245 |
| 6,963,914 B1 | 11/2005 | Breitbart et al. |
| 6,963,917 B1 | 11/2005 | Callis et al. |
| 6,985,956 B2 | 1/2006 | Luke et al. |
| 6,987,763 B2 | 1/2006 | Rochberger et al. |
| 6,996,615 B1 | 2/2006 | McGuire |
| 6,996,616 B1 | 2/2006 | Leighton et al. |
| 7,000,007 B1 | 2/2006 | Valenti |
| 7,009,968 B2 | 3/2006 | Ambe et al. |
| 7,020,698 B2 | 3/2006 | Andrews et al. |
| 7,020,714 B2 | 3/2006 | Kalyanaraman et al. |
| 7,028,083 B2 | 4/2006 | Levine et al. |
| 7,031,304 B1 | 4/2006 | Arberg et al. |
| 7,032,010 B1 | 4/2006 | Swildens et al. |
| 7,036,039 B2 | 4/2006 | Holland |
| 7,058,717 B2 | 6/2006 | Chao et al. |
| 7,062,642 B1 | 6/2006 | Langride et al. |
| 7,086,061 B1 | 8/2006 | Joshi et al. |
| 7,089,293 B2 | 8/2006 | Grosner et al. |
| 7,117,530 B1 | 10/2006 | Lin |
| 7,126,910 B1 * | 10/2006 | Sridhar ......................... 370/229 |
| 7,127,713 B2 | 10/2006 | Davis et al. |
| 7,136,932 B1 | 11/2006 | Schneider |
| 7,139,242 B2 | 11/2006 | Bays |
| 7,177,933 B2 | 2/2007 | Foth |
| 7,185,052 B2 | 2/2007 | Day |
| 7,187,687 B1 | 3/2007 | Davis et al. |
| 7,188,189 B2 | 3/2007 | Karol et al. |
| 7,197,547 B1 | 3/2007 | Miller et al. |
| 7,206,806 B2 | 4/2007 | Pineau |
| 7,215,637 B1 * | 5/2007 | Ferguson et al. ........... 370/230.1 |
| 7,225,272 B2 | 5/2007 | Kelley et al. |
| 7,240,015 B1 | 7/2007 | Karmouch et al. |
| 7,240,100 B1 | 7/2007 | Wein et al. |
| 7,254,626 B1 | 8/2007 | Kommula et al. |
| 7,257,642 B1 | 8/2007 | Bridger et al. |
| 7,260,645 B2 | 8/2007 | Bays |
| 7,266,117 B1 | 9/2007 | Davis |
| 7,266,120 B2 | 9/2007 | Cheng et al. |
| 7,277,954 B1 | 10/2007 | Stewart et al. |
| 7,292,573 B2 | 11/2007 | LaVigne et al. |
| 7,296,088 B1 | 11/2007 | Padmanabhan et al. |
| 7,321,926 B1 | 1/2008 | Zhang et al. |
| 7,424,018 B2 | 9/2008 | Gallatin et al. |
| 7,436,832 B2 | 10/2008 | Gallatin et al. |
| 7,440,467 B2 | 10/2008 | Gallatin et al. |
| 7,441,045 B2 | 10/2008 | Skene et al. |
| 7,450,527 B2 | 11/2008 | Ashwood Smith |
| 7,454,500 B1 | 11/2008 | Hsu et al. |
| 7,483,374 B2 * | 1/2009 | Nilakantan et al. ........... 370/235 |
| 7,506,065 B2 | 3/2009 | LaVigne et al. |
| 7,555,562 B2 | 6/2009 | See et al. |
| 7,558,195 B1 | 7/2009 | Kuo et al. |
| 7,574,508 B1 | 8/2009 | Kommula |
| 7,581,009 B1 | 8/2009 | Hsu et al. |
| 7,584,301 B1 | 9/2009 | Joshi |
| 7,587,487 B1 | 9/2009 | Gunturu |
| 7,606,203 B1 | 10/2009 | Shabtay et al. |
| 7,647,427 B1 | 1/2010 | Devarapalli |
| 7,657,629 B1 | 2/2010 | Kommula |
| 7,690,040 B2 | 3/2010 | Frattura et al. |
| 7,706,363 B1 | 4/2010 | Daniel et al. |
| 7,716,370 B1 | 5/2010 | Devarapalli |
| 7,720,066 B2 | 5/2010 | Weyman et al. |
| 7,720,076 B2 | 5/2010 | Dobbins et al. |
| 7,747,737 B1 | 6/2010 | Apte et al. |
| 7,756,965 B2 | 7/2010 | Joshi |
| 7,774,833 B1 | 8/2010 | Szeto et al. |
| 7,787,454 B1 | 8/2010 | Won et al. |
| 7,792,047 B2 | 9/2010 | Gallatin et al. |
| 7,835,358 B2 | 11/2010 | Gallatin et al. |
| 7,840,678 B2 | 11/2010 | Joshi |
| 7,848,326 B1 | 12/2010 | Leong et al. |
| 7,889,748 B1 | 2/2011 | Leong et al. |
| 7,899,899 B2 | 3/2011 | Joshi |
| 7,940,766 B2 | 5/2011 | Olakangil et al. |
| 7,953,089 B1 | 5/2011 | Ramakrishnan et al. |
| 8,208,494 B2 | 6/2012 | Leong |
| 8,238,344 B1 | 8/2012 | Chen et al. |
| 8,239,960 B2 | 8/2012 | Frattura et al. |
| 8,248,928 B1 | 8/2012 | Wang et al. |
| 8,270,845 B2 | 9/2012 | Cheung et al. |
| 8,315,256 B2 | 11/2012 | Leong et al. |
| 8,386,846 B2 | 2/2013 | Cheung |
| 8,391,286 B2 | 3/2013 | Gallatin et al. |
| 8,504,721 B2 | 8/2013 | Hsu et al. |
| 8,514,718 B2 | 8/2013 | Zijst |
| 8,537,697 B2 | 9/2013 | Leong et al. |
| 8,570,862 B1 | 10/2013 | Leong et al. |
| 8,615,008 B2 | 12/2013 | Natarajan et al. |
| 8,654,651 B2 | 2/2014 | Leong et al. |
| 8,824,466 B2 | 9/2014 | Won et al. |
| 8,830,819 B2 | 9/2014 | Leong et al. |
| 8,873,557 B2 | 10/2014 | Nguyen |
| 8,891,527 B2 | 11/2014 | Wang |
| 8,897,138 B2 | 11/2014 | Yu et al. |
| 8,953,458 B2 | 2/2015 | Leong et al. |
| 2001/0049741 A1 | 12/2001 | Skene et al. |

(56) References Cited

U.S. PATENT DOCUMENTS

| | | |
|---|---|---|
| 2001/0052016 A1 | 12/2001 | Skene et al. |
| 2002/0018796 A1 | 2/2002 | Wironen |
| 2002/0023089 A1* | 2/2002 | Woo .............................. 707/101 |
| 2002/0026551 A1 | 2/2002 | Kamimaki et al. |
| 2002/0038360 A1 | 3/2002 | Andrews et al. |
| 2002/0055939 A1 | 5/2002 | Nardone et al. |
| 2002/0059170 A1 | 5/2002 | Vange |
| 2002/0059464 A1 | 5/2002 | Hata et al. |
| 2002/0062372 A1 | 5/2002 | Hong et al. |
| 2002/0078233 A1 | 6/2002 | Biliris et al. |
| 2002/0091840 A1 | 7/2002 | Pulier et al. |
| 2002/0112036 A1 | 8/2002 | Bohannan et al. |
| 2002/0120743 A1 | 8/2002 | Shabtay et al. |
| 2002/0124096 A1 | 9/2002 | Loguinov et al. |
| 2002/0133601 A1 | 9/2002 | Kennamer et al. |
| 2002/0150048 A1 | 10/2002 | Ha et al. |
| 2002/0154600 A1 | 10/2002 | Ido et al. |
| 2002/0188862 A1 | 12/2002 | Trethewey et al. |
| 2002/0194324 A1 | 12/2002 | Guha |
| 2002/0194335 A1 | 12/2002 | Maynard |
| 2003/0031185 A1 | 2/2003 | Kikuchi et al. |
| 2003/0035430 A1 | 2/2003 | Islam et al. |
| 2003/0065711 A1 | 4/2003 | Acharya et al. |
| 2003/0065763 A1 | 4/2003 | Swildens et al. |
| 2003/0105797 A1 | 6/2003 | Dolev et al. |
| 2003/0115283 A1 | 6/2003 | Barbir et al. |
| 2003/0135509 A1 | 7/2003 | Davis et al. |
| 2003/0202511 A1* | 10/2003 | Sreejith et al. ................ 370/389 |
| 2003/0210686 A1 | 11/2003 | Terrell et al. |
| 2003/0210694 A1 | 11/2003 | Jayaraman et al. |
| 2003/0229697 A1 | 12/2003 | Borella |
| 2004/0019680 A1 | 1/2004 | Chao et al. |
| 2004/0024872 A1 | 2/2004 | Kelley et al. |
| 2004/0064577 A1 | 4/2004 | Dahlin et al. |
| 2004/0194102 A1 | 9/2004 | Neerdaels |
| 2004/0249939 A1 | 12/2004 | Amini et al. |
| 2004/0249971 A1 | 12/2004 | Klinker |
| 2005/0021883 A1 | 1/2005 | Shishizuka et al. |
| 2005/0033858 A1 | 2/2005 | Swildens et al. |
| 2005/0060418 A1* | 3/2005 | Sorokopud ................... 709/230 |
| 2005/0060427 A1* | 3/2005 | Phillips et al. ............... 709/238 |
| 2005/0086295 A1 | 4/2005 | Cunningham et al. |
| 2005/0149531 A1 | 7/2005 | Srivastava |
| 2005/0169180 A1 | 8/2005 | Ludwig |
| 2005/0190695 A1* | 9/2005 | Phaal ........................... 370/229 |
| 2005/0207417 A1* | 9/2005 | Ogawa et al. ................ 370/390 |
| 2005/0278565 A1 | 12/2005 | Frattura et al. |
| 2005/0286416 A1 | 12/2005 | Shimonishi et al. |
| 2006/0036743 A1 | 2/2006 | Deng et al. |
| 2006/0039374 A1* | 2/2006 | Belz et al. .................... 370/389 |
| 2006/0045082 A1* | 3/2006 | Fertell et al. ................. 370/389 |
| 2006/0143300 A1* | 6/2006 | See et al. ..................... 709/227 |
| 2007/0195761 A1* | 8/2007 | Tatar et al. ................... 370/389 |
| 2007/0233891 A1* | 10/2007 | Luby et al. ................... 709/231 |
| 2008/0002591 A1* | 1/2008 | Ueno ............................ 370/244 |
| 2008/0031141 A1* | 2/2008 | Lean et al. ................... 370/241 |
| 2008/0159141 A1* | 7/2008 | Soukup et al. ............... 370/235 |
| 2008/0195731 A1* | 8/2008 | Harmel et al. ............... 709/224 |
| 2008/0225710 A1* | 9/2008 | Raja et al. .................. 370/230.1 |
| 2008/0304423 A1* | 12/2008 | Chuang et al. .............. 370/253 |
| 2009/0135835 A1 | 5/2009 | Gallatin et al. |
| 2009/0262745 A1 | 10/2009 | Leong et al. |
| 2010/0011126 A1 | 1/2010 | Hsu et al. |
| 2010/0135323 A1 | 6/2010 | Leong |
| 2010/0209047 A1 | 8/2010 | Cheung et al. |
| 2010/0293296 A1 | 11/2010 | Hsu et al. |
| 2010/0325178 A1 | 12/2010 | Won et al. |
| 2011/0044349 A1 | 2/2011 | Gallatin et al. |
| 2011/0058566 A1 | 3/2011 | Leong et al. |
| 2011/0211443 A1 | 9/2011 | Leong et al. |
| 2011/0216771 A1 | 9/2011 | Gallatin et al. |
| 2012/0023340 A1 | 1/2012 | Cheung |
| 2012/0157088 A1 | 6/2012 | Gerber et al. |
| 2012/0243533 A1 | 9/2012 | Leong |
| 2012/0257635 A1 | 10/2012 | Gallatin et al. |
| 2013/0010613 A1 | 1/2013 | Cafarelli et al. |
| 2013/0034107 A1 | 2/2013 | Leong et al. |
| 2013/0156029 A1 | 6/2013 | Gallatin et al. |
| 2013/0173784 A1 | 7/2013 | Wang et al. |
| 2013/0201984 A1 | 8/2013 | Wang |
| 2013/0259037 A1 | 10/2013 | Natarajan et al. |
| 2013/0272135 A1 | 10/2013 | Leong |
| 2014/0016500 A1 | 1/2014 | Leong et al. |
| 2014/0022916 A1 | 1/2014 | Natarajan et al. |
| 2014/0029451 A1 | 1/2014 | Nguyen |
| 2014/0040478 A1 | 2/2014 | Hsu et al. |
| 2014/0204747 A1 | 7/2014 | Yu et al. |
| 2014/0321278 A1 | 10/2014 | Cafarelli et al. |
| 2015/0033169 A1 | 1/2015 | Lection et al. |
| 2015/0180802 A1 | 6/2015 | Chen et al. |
| 2015/0215841 A1 | 7/2015 | Hsu et al. |

OTHER PUBLICATIONS

U.S. Appl. No. 60/169,502, filed Dec. 7, 2009 by Yeejang James Lin.
U.S. Appl. No. 60/182,812, filed Feb. 16, 2000, by Skene et al.
U.S. Appl. No. 09/459,815, filed Dec. 13, 1999, by Skene et al.
Delgadillo, "Cisco Distributed Director," White Paper, 1999, at URL: http://www-europe.cisco.warp/public/751/distdir/dd_wp.htm, (19 pages) with Table of Contents for TeleCon (16 pages).
Cisco LocalDirector Version 1.6.3 Release Notes, Oct. 1997, Cisco Systems, Inc. Doc No. 78-3880-05.
Foundry Networks Announces Application Aware Layer 7 Switching on SeverIron Platform, (Mar. 1999).
Foundry ServerIron Installation and Configuration Guide (May 2000), Table of Contents—Chapter 5, http://web.archive.org/web/20000815085849/http://www.foundrynetworks.com/techdocs/SI/index.html.
Foundry ServerIron Installation and Configuration Guide (May 2000), Chapter 6-10, http://web.archive.org/web/20000815085849/http://www.foundrynetworks.com/techdocs/SI/index.html.
Foundry ServerIron Installation and Configuration Guide (May 2000), Chapter 11—Appendix C, http://web.archive.org/web/20000815085849/http://www.foundrynetworks.com/techdocs/SI/index.html.
U.S. Appl. No. 14/320,138, filed Jun. 30, 2014 by Chen et al., (Unpublished).
U.S. Appl. No. 61/919,244, filed Dec. 20, 2013 by Chen et al.
U.S. Appl. No. 61/932,650, filed Jan. 28, 2014 by Munshi et al.
U.S. Appl. No. 61/994,693, filed May 16, 2014 by Munshi et al.
U.S. Appl. No. 62/088,434, filed Dec. 5, 2014 by Hsu et al.
U.S. Appl. No. 62/137,073, filed Mar. 23, 2015 by Chen et al.
U.S. Appl. No. 62/137,084, filed Mar. 23, 2015 by Chen et al.
U.S. Appl. No. 62/137,096, filed Mar. 23, 2015 by Laxman et al.
U.S. Appl. No. 62/137,106, filed Mar. 23, 2015 by Laxman et al.
U.S. Appl. No. 60/998,410, filed Oct. 9, 2007 by Wang et al.
PCT Patent Application No. PCT/US2015/012915 filed on Jan. 26, 2015 by Hsu et al.
U.S. Appl. No. 14/848,586, filed Sep. 9, 2015 by Chen et al., (Unpublished).
U.S. Appl. No. 14/848,645, filed Sep. 9, 2015 by Chen et al., (Unpublished).
U.S. Appl. No. 14/848,677, filed Sep. 9, 2015 by Chen et al., (Unpublished).
Brocade and IBM Real-Time Network Analysis Solution; 2011 Brocade Communications Systems, Inc.; 2 pages.
Brocade IP Network Leadership Technology; Enabling Non-Stop Networking for Stackable Switches with Hitless Failover; 2010; 3 pages.
Gigamon Adaptive Packet Filtering; Feature Breif; 3098-03 Apr. 2015; 3 pages.
Gigamon: Active Visibility for Multi-Tiered Security Solutions Overview; 3127-02; Oct. 2014; 5 pages.
Gigamon: Application Note Stateful GTP Correlation; 4025-02; Dec. 2013; 9 pages.
Gigamon: Enabling Network Monitoring at 40Gbps and 100Gbps with Flow Mapping Technology White Paper; 2012; 4 pages.
Gigamon: Enterprise System Reference Architecture for the Visibility Fabric White Paper; 5005-03; Oct. 2014; 13 pages.

(56) References Cited

OTHER PUBLICATIONS

Gigamon: Gigamon Intelligent Flow Mapping White Paper; 3039-02; Aug. 2013; 7 pages.
Gigamon: GigaVUE-HB1 Data Sheet; 4011-07; Oct. 2014; 4 pages.
Gigamon: Maintaining 3G and 4G LTE Quality of Service White Paper; 2012; 4 pages.
Gigamon: Monitoring, Managing, and Securing SDN Deployments White Paper; 3106-01; May 2014; 7 pages.
Gigamon: Netflow Generation Feature Brief; 3099-04; Oct. 2014; 2 pages.
Gigamon: Service Provider System Reference Architecture for the Visibility Fabric White Paper; 5004-01; Mar. 2014; 11 pages.
Gigamon: The Visibility Fabric Architecture—A New Approach to Traffic Visibility White Paper; 2012-2013; 8 pages.
Gigamon: Unified Visibility Fabric—A New Approach to Visibility White Paper; 3072-04; Jan. 2015; 6 pages.
Gigamon: Unified Visibility Fabric Solution Brief; 3018-03; Jan. 2015; 4 pages.
Gigamon: Unified Visibility Fabric; https://www.gigamon.com/unified-visibility-fabric; Apr. 7, 2015; 5 pages.
Gigamon: Visibility Fabric Architecture Solution Brief; 2012-2013; 2 pages.
Gigamon: Visibility Fabric; More than Tap and Aggregation.bmp; 2014; 1 page.
Gigamon: Vistapointe Technology Solution Brief; Visualize-Optimize-Monetize-3100-02; Feb. 2014; 2 pages.
IBM User Guide, Version 2.1 AIX, Solaris and Windows NT, Third Edition (Mar. 1999) 102 Pages.
International Search Report & Written Opinion for PCT Application PCT/US2015/012915 mailed Apr. 10, 2015, 15 pages.
Ixia Anue GTP Session Controller; Solution Brief; 915-6606-01 Rev. A, Sep. 2013; 2 pages.
Ixia: Creating a Visibility Architecture—a New Perspective on Network Visibilty White Paper; 915-6581-01 Rev. A, Feb. 2014; 14 pages.
Netscout: nGenius Subscriber Intelligence; Data Sheet; SPDS_001-12; 2012; 6 pages.
Netscout; Comprehensive Core-to-Access IP Session Analysis for GPRS and UMTS Networks; Technical Brief; Jul. 16, 2010; 6 pages.
ntop: Monitoring Mobile Networks (2G, 3G and LTE) using nProbe; http://www.ntop.org/nprobe/monitoring-mobile-networks-2g-3g-and-lte-using-nprobe; Apr. 2, 2015; 4 pages.
White Paper, Foundry Networks, "Server Load Balancing in Today's Web-Enabled Enterprises" Apr. 2002 10 Pages.
Non-Final Office Action for U.S. Appl. No. 11/827,524 mailed on Dec. 10, 2009, 15 pages.
Non-Final Office Action for U.S. Appl. No. 11/827,524 mailed on Jun. 2, 2010, 14 pages.
Non-Final Office Action for U.S. Appl. No. 11/827,524 mailed on Nov. 26, 2010, 16 pages.
Final Office Action for U.S. Appl. No. 11/827,524 mailed on May 6, 2011, 19 pages.
Advisory Action for U.S. Appl. No. 11/827,524 mailed on Jul. 14, 2011, 5 pages.
Non-Final Office Action for U.S. Appl. No. 11/827,524 mailed on Oct. 18, 2012, 24 pages.
Notice of Allowance for U.S. Appl. No. 11/827,524 mailed on Jun. 25, 2013, 11 pages.
Non-Final Office Action for U.S. Appl. No. 14/030,782 mailed on Oct. 6, 2014, 14 pages.
Final Office Action for U.S. Appl. No. 14/030,782 mailed on Jul. 29, 2015, 26 pages.
Non-Final Office Action for U.S. Appl. No. 11/937,285 mailed on Jul. 6, 2009, 28 pages.
Final Office Action for U.S. Appl. No. 11/937,285 mailed on Mar. 3, 2010, 28 pages.
Non-Final Office Action for U.S. Appl. No. 11/937,285 mailed on Aug. 17, 2010, 28 pages.
Final Office Action for U.S. Appl. No. 11/937,285 mailed on Jan. 20, 2011, 41 pages.
Final Office Action for U.S. Appl. No. 11/937,285 mailed on May 20, 2011, 37 pages.
Non-Final Office Action for U.S. Appl. No. 11/937,285 mailed on Nov. 28, 2011, 40 pages.
Notice of Allowance for U.S. Appl. No. 11/937,285 mailed on Jun. 5, 2012, 10 pages.
Notice of Allowance for U.S. Appl. No. 14/030,782, mailed on Nov. 16, 2015, 20 pages.

\* cited by examiner

Flowchart 200

Network Device 300

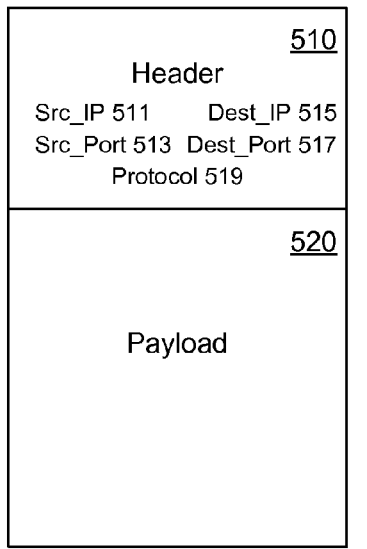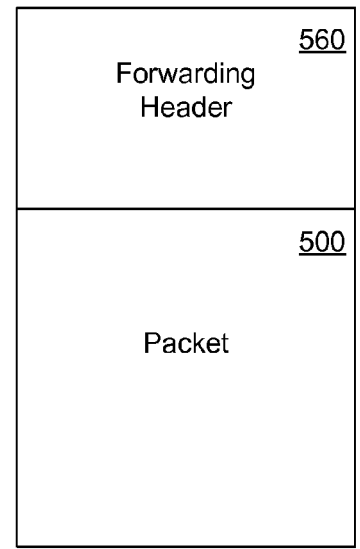
Packet 500                Packet 550
FIG. 5

Flowchart 600

Flowchart 700

|  | CAM |  |  |  |  | 800 |
|---|---|---|---|---|---|---|
|  | SrcIP | DstIP | SrcPt | DstPt | Prot | PRAM Index |
| entry 801 → | xxx..xxx00 | xxx..xxx00 | x...x | 80 | x | PRAM_Addr1 ← index 807 |
| entry 811 → | xxx..xxx00 | xxx..xxx01 | x...x | 80 | x | PRAM_Addr2 |
|  | xxx..xxx00 | xxx..xxx10 | x...x | 80 | x | PRAM_Addr3 |
|  | xxx..xxx00 | xxx..xxx11 | x...x | 80 | x | PRAM_Addr1 |
| entry 821 → | xxx..xxx01 | xxx..xxx00 | x...x | 80 | x | PRAM_Addr2 |
|  | . | | | | | |
|  | . | | | | | |
|  | . | | | | | |
|  | xxx..xxx11 | xxx..xxx11 | x...x | 80 | x | PRAM_Addr3 |
| entry 831 → | xxx..xxx00 | xxx..xxx00 | x...x | x | x | PRAM_Addr4 |
|  | . | | | | | |
|  | . | | | | | |
|  | . | | | | | |
|  | xxx..xxx11 | xxx..xxx11 | x...x | x | x | PRAM_Addr5 |

|  | PRAM | 850 |
|---|---|---|
|  | PRAM Addr | Frwd Info |
| entry 857 → | PRAM_Addr1 | Server 1 |
|  | PRAM_Addr2 | Server 2 |
|  | PRAM_Addr3 | Server 3 |
|  | PRAM_Addr4 | Server 4 |
|  | PRAM_Addr5 | Server 5 |

FIG. 8

Flowchart 900

MONITORING SERVER LOAD BALANCING

This application is a continuation application of the U.S. patent application Ser. No. 11/937,285, entitled "Monitoring Server Load Balancing", with a filing date Nov. 8, 2007, now U.S. Pat. No. 8,248,928, issued Aug. 21, 2012, to WANG, et al., assigned to the assignee of the present application, and hereby incorporated by reference in its entirety.

This application claims the benefit under 35 U.S.C. §119 (e) of U.S. Provisional Application Ser. No. 60/998,410, filed on Oct. 9, 2007, to Wang et al., entitled "MONITORING SERVER LOAD BALANCING"and which is incorporated herein in its entirety.

BACKGROUND

In a busy networking environment, such as a large corporation or an Internet service provider (ISP), it is often useful to be able to monitor some or all of the traffic passing through the network, such as the traffic that passes through a router between the network and the Internet. Numerous applications for such monitoring exist, such as intrusion detection systems (IDS), antivirus and antispam monitoring, or bandwidth monitoring. A significant barrier to such monitoring is the sheer quantity of data to be monitored. Even in a relatively small corporate environment, network traffic through the central router may represent dozens of simultaneous transactions, for multiple users across multiple protocols. As the networking environment increases in size, so too does the magnitude of data to monitored, quickly surpassing the point where a single monitoring system can handle the workload.

Load-balancing is an approach intended to help alleviate this problem. Multiple monitoring systems are utilized, and the data to be monitored is spread across them. However, load-balancing introduces different problems, such as how to distribute the data across multiple servers quickly and efficiently. While several software-based approaches exist, they cannot scale to handle a large networking environment; as additional data passes through a central router, a software load-balancing system becomes a new bottleneck. Software takes too long to process data and forward it to the appropriate monitoring server, which results in loss of packets.

SUMMARY

Embodiments described herein discuss an approach to implementing load-balancing across multiple monitoring servers. One such embodiment describes a network monitoring device. The network monitoring device includes an ingress port, for receiving mirrored network packets, and a number of egress ports. The egress ports are associated with a number of monitoring servers, and used to forward the mirrored network packets to the monitoring servers. A packet classifier, coupled to the ingress port, examines the mirrored network packets, and determines which of the monitoring servers should receive the packets.

Another embodiment describes a method of load-balancing across multiple monitoring servers in a monitored network. The method calls for generating forwarding information from anticipated network traffic and a number of available monitoring servers. The method also entails receiving an incoming network packet into a network monitoring device, and examining a header associated with a network packet. A destination monitoring server is selected from the available monitoring servers, using the header and the forwarding information.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 5 depicts exemplary networking packets, in accordance with one embodiment.

FIG. 8 is a depiction of CAM and PRAM entries, in accordance with one embodiment.

DETAILED DESCRIPTION

Figure 1:
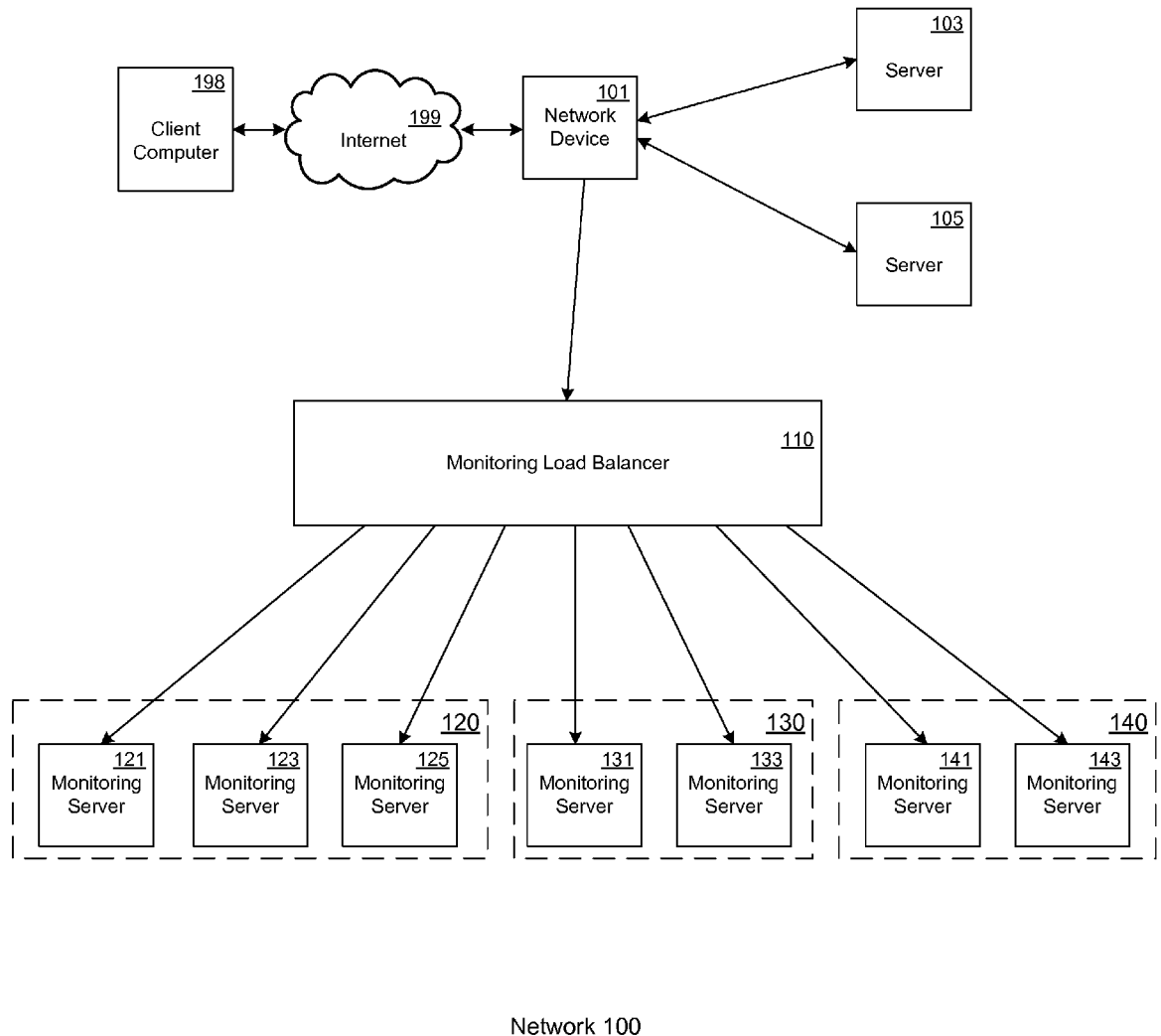
FIG. 1 is a diagram of a monitored network, in accordance with one embodiment.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIG. 6) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Load Balancing in a Monitored Network

In the embodiments described below, an approach to load-balancing for monitoring systems is described. In several embodiments, a network device, such as a high-speed router or switch or other network device, can be configured to perform load-balancing, by distributing traffic across multiple monitoring servers, and across multiple groups of such servers, at line speeds. Groups can be configured, e.g., based on networking protocol, and monitoring servers within these groups can be assigned a range of anticipated network traffic. As traffic is received, header information from each packet, e.g., a hash of source and destination identifiers, is used to quickly retrieve the appropriate monitoring server, and route the packet to the destination. The load-balancing network device may forward the traffic to the monitoring servers using pre-programmed hardware, or using a processor under software control.

These embodiments have multiple applications. For example, passive monitoring systems, such as intrusion detection systems (IDS), can be implemented, which allow network traffic to be examined by a pool of IDS servers, e.g., grouped by networking protocol. Similar implementations allow for monitoring of potential virus, spyware, or spam activity within the network. Further, several embodiments can be extended for more active monitoring rules, e.g., by allowing a monitoring server a degree of control over the (monitored) central router.

Load-Balancing in a Networking Environment

With reference now to FIG. 1, a monitored network 100 is depicted, in accordance with one embodiment. While network 100 is shown as incorporating specific, enumerated features, elements, and arrangements, it is understood that embodiments are well suited to applications involving additional, fewer, or different features, elements, or arrangements.

FIG. 1 depicts a networking environment, where a number of servers, e.g., server 103 and server 105, are connected to the Internet, e.g., Internet 199, through a network device 101, such as a router or a switch. In order to monitor traffic flowing between the servers and the Internet, a monitoring load balancer 110 is coupled to network device 101. Some or all of the traffic that passes through network device 101, in either or both directions, can be copied to network monitoring device 110. In different embodiments, network device 101 may vary; for example, network device 101 may be a router, a L2, L2-3, or L2-7 switch, a load balancer, or any other desirable network device. Similarly, monitoring load balancer 110 may be implemented, in different embodiments, as a router, a L2, L2-3, or L2-7 switch, a load balancer, or any other desirable network device.

Network monitoring device 110, in turn, is coupled to a plurality of monitoring servers, e.g., monitoring servers 121, 123, 125, 131, 133, 141, and 143. These monitoring servers are shown as being arranged in groups according to networking protocol, e.g., HTTP traffic is associated with group 120, while FTP and telnet traffic is associated with group 130, and other (unspecified) protocols are associated with group 140. Monitoring load balancer 110 is tasked with load-balancing network traffic across these various groups of monitoring servers, and across individual monitoring servers within the groups. In some embodiments, traffic is uni-directional along this path between network device 101 to the monitoring servers. In these embodiments, the monitoring servers do not reply to network device 101. Rather, each monitoring server may analyze the received packets for determining the desired monitoring output, e.g., providing intrusion detection information for a system administrator.

Figure 2:
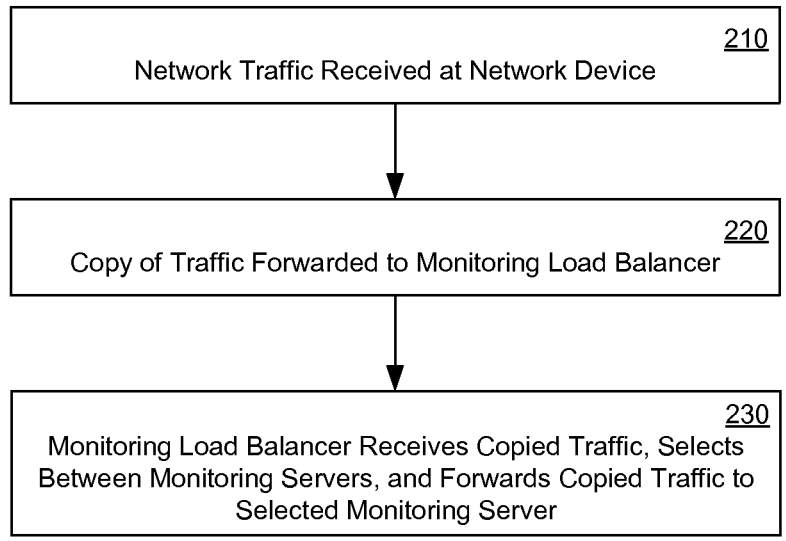
FIG. 2 is a flowchart of a method of load-balancing, in accordance with one embodiment.

With reference now to FIG. 2, a flowchart 200 of a method of load-balancing is depicted, in accordance with one embodiment. Although specific steps are disclosed in flowchart 200, such steps are exemplary. That is, embodiments of the present invention are well suited to performing various other (additional) steps or variations of the steps recited in flowchart 200. It is appreciated that the steps in flowchart 200 may be performed in an order different than presented, and that not all of the steps in flowchart 200 may be performed.

With reference now to step 210, network traffic flows to a network device. In different embodiments, such traffic may pass between a network and the Internet, or between locations within the same network. Also, such traffic may include any of a wide range of networking protocols, e.g., HTTP, telnet, or FTP. For example, client 198 transmits an HTTP request to server 103 by way of Internet 199 and network device 101.

With reference now to step 220, the network traffic is copied, and forwarded to a network monitoring device. In different embodiments, different approaches are utilized for diverting copies of network traffic. In one embodiment for example, with reference to FIG. 1, network device 101 is configured to "mirror" traffic, creating a duplicate copy of networking packets, which is forwarded to network monitoring device 110. Such mirroring can be selectively configured, e.g., to mirror some or all traffic, or traffic passing in a specified direction through network device 101, or traffic of certain protocols, etc. In another embodiment, another approach is used for duplicating network traffic for monitoring purposes, e.g., an in-line tap can be used to duplicate traffic, and pass it to network monitoring device 110.

With reference now to step 230, the network monitoring device receives the copied traffic, selects between available monitoring servers, and forwards the copied network traffic to the selected monitoring server via an egress port of the network monitoring device associated with the selected monitoring server. In different embodiments, such selection is accomplished in different ways. For example, in one embodiment, data is extracted from the traffic, and used to select a server or egress port. For instance, one or more fields of a networking packet header are extracted from a received packet, and subjected to a function, e.g., a hash function. The resulting value, e.g., hash value, is used to determine which egress port should output the received packet, thereby forwarding the received packet to the selected monitoring server coupled to that egress port.

Exemplary Networking Device

Figure 3:
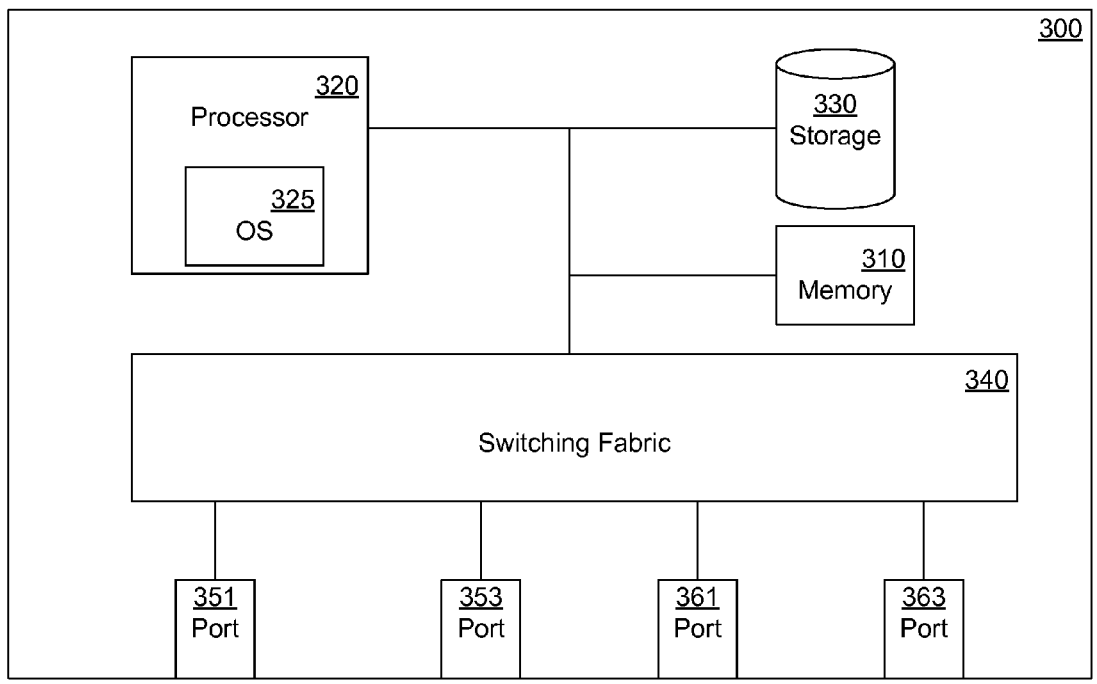
FIG. 3 is a block diagram of a network device, in accordance with one embodiment.

With reference now to FIG. 3, a block diagram of an exemplary network device 300 is depicted, in accordance with one embodiment. While network device 300 is shown as incorporating specific, enumerated features, elements, and arrangements, it is understood that embodiments are well suited to applications involving additional, fewer, or different features, elements, or arrangements.

As shown, network device 300 includes memory 310, processor 320, storage 330, switching fabric 340, and several communications ports, e.g., ports 351, 353, 361, and 363. Processor 320 executes instructions for controlling network device 300, and for managing traffic passing through network device 300. An operating system 325 is shown as executing on processor 320; in some embodiments, operating system 325 supplies the programmatic interface to network device 300.

Network device 300 is also shown as including storage 330. In different embodiments, different types of storage may be utilized, as well as the differing amounts of storage. For example, in some embodiments, storage 330 may consist of flash memory, magnetic storage media, or any other appropriate storage type, or combinations thereof. In some embodiments, storage 330 is used to store operating system 325, which is loaded into processor 320 when network device 300 is initialized.

Figure 4:
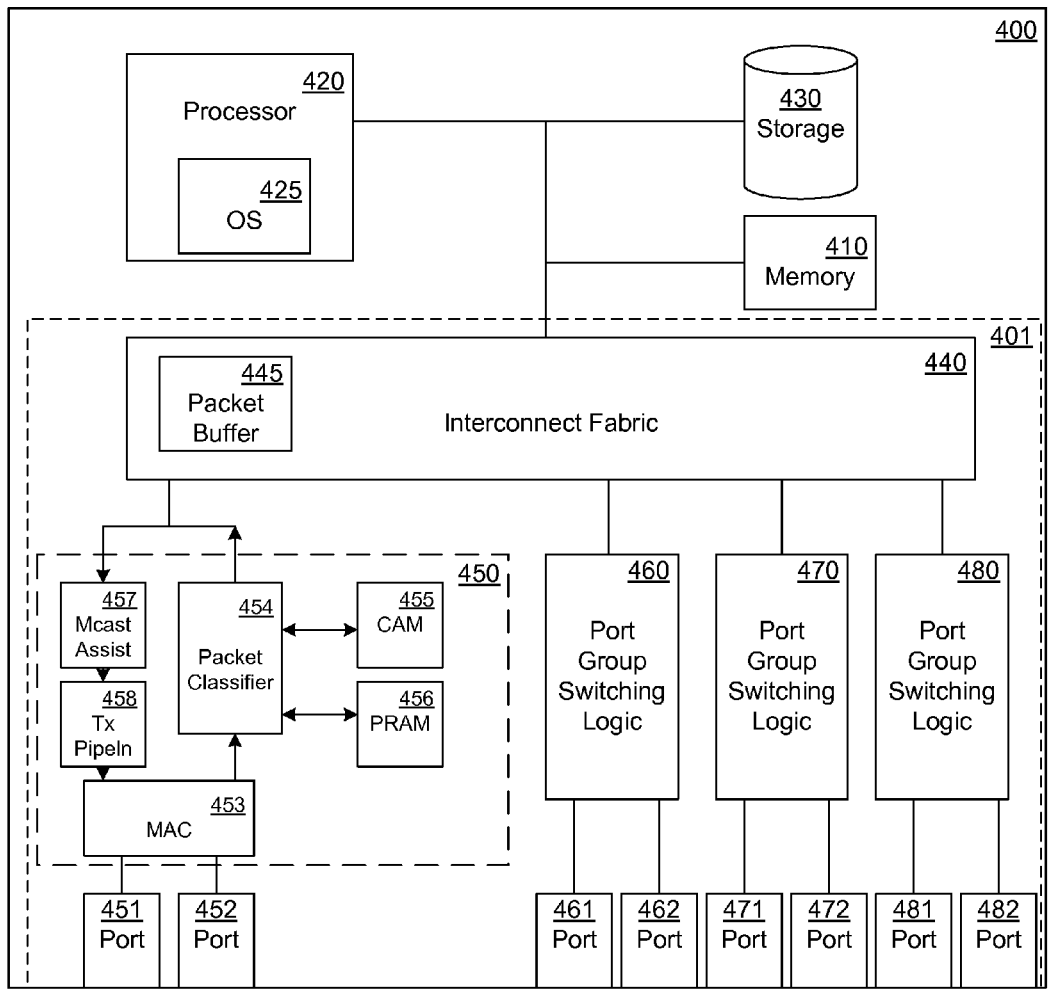
FIG. 4 is a block diagram of a network device, in accordance with one embodiment.

Network device 300 also includes switching fabric 340. In the depicted embodiment, switching fabric 340 is the hardware, software, or combination thereof that passes traffic between an ingress port and one or more egress ports of network device 300. Switching fabric 340, as shown, may include packet processors, e.g., application-specific integrated circuits (ASICs) or field programmable gate arrays (FPGAs), and/or controlling programming used to analyze network traffic, applying appropriate networking rules, and forward traffic between ports of network device 300. In several of the embodiments described herein, it is understood that configuring or instructing a port to perform an action involves configuring or instructing that portion of the switching fabric that controls the indicated port to perform that action. FIG. 4, below, depicts a more detailed embodiment of a network device, with some of the functionality ascribed to switching fabric 340 in network device 300 examined in greater detail.

Network device 300 can be utilized as network device 101 in network 200. When so used, network device 300 can be configured to "mirror" network traffic received on one or more ports, and forward copies of the traffic to a specified location. For example, network device 300, used as network device 101, could be configured such that traffic received on ports 351 and 353 is copied, and forwarded to port 361, which connects to network monitoring device 110.

Network device 300 could also be utilized as a network monitoring device, e.g., monitoring load balancer 110 in network 200. When so used, network device 300 is configured to receive copies of network traffic, select between a number of available monitoring servers, and forward the traffic to the selected server. One such embodiment is explored in greater detail, below. It is understood that network device 101 and monitoring load balancer 110 may be any device capable of performing at least the operations ascribed to them herein.

With reference now to FIG. 4, a block diagram of network device 400 is depicted, in accordance with one embodiment. While network device 400 is shown as incorporating specific, enumerated elements, features, and arrangements, it is understood that embodiments are well suited to applications involving additional, fewer, or different elements, features, or arrangements.

As shown, network device 400 includes networking interface module 401, memory 410, processor 420, storage 430, and interconnect fabric 440. Processor 420 executes instructions for controlling network device 400, and for managing traffic passing through network device 400. An operating system 425 is shown as executing on processor 420; in some embodiments, operating system 425 supplies the programmatic interface to network device 400.

Network device 400 is also shown as including storage 430. In different embodiments, different types of storage may be utilized, as well as the differing amounts of storage. For example, in some embodiments, storage 430 may consist of flash memory, magnetic storage media, or any other appropriate storage type, or combinations thereof. In some embodiments, storage 430 is used to store operating system 425, which is loaded into processor 420 when network device 400 is initialized.

Networking interface module 401, in the depicted embodiment, is made up of a number of physical ports connected to port group switching logic subsystems, interconnected by an interconnect fabric. Networking interface module 401 is shown as incorporating a number of physical ports, e.g., ports 451, 452, 461, 462, 471, 472, 481, and 482. These physical ports, in this embodiment, provide conductivity to end stations or other network devices. In different embodiments, such physical ports may be auto-sensing, half duplex, or full-duplex. These physical ports may offer connectivity for Ethernet, Fast Ethernet, gigabit Ethernet, 10 gigabit Ethernet, or any other compatible network protocol.

In the depicted embodiment, physical ports are coupled to interconnect fabric 440 by means of port group switching logic, e.g., port group switching logic 450, 460, 470, or 480. In the depicted embodiment, port group switching logic of 450 includes media access controller (MAC) 453, packet classifier 454, content addressable memory (CAM) 455, parameter random access memory (PRAM) 456, multicast assist module 457, and transmit pipeline 458. In different embodiments, different arrangements or combinations of these or similar elements may be utilized. In particular, in some embodiments, some or all of these elements may be shared across multiple port group switching logic subsystems.

Media access controller 453, in the depicted embodiment, provides continuous data flow between the physical ports, e.g., physical ports 451 and 452, and packet classifier 454. MAC 453 is responsible for encoding and decoding, cyclic redundancy check (CRC) verification for incoming packets, CRC calculation for outgoing packets, and auto-negotiation logic.

Packet classifier 454, in the depicted embodiment, is an integrated circuit, responsible for parsing and examining incoming packets in order to determine how the packet should be forwarded. In some embodiments, packet classifier 454 may be implemented as an application-specific integrated circuit (ASIC); in other embodiments, packet classifier 454 may be implemented as a field-programmable gate array (FPGA). In one embodiment, packet classifier 454 is a processor, executing software instructions.

Packet classifier 454 interfaces with CAM 455 and PRAM 456. CAM 455 and PRAM 456 are programmed, e.g., by OS 425, with information which, directly or indirectly, indicates how the packet should be forwarded through network device 400. In particular, packet classifier 454 attaches a forwarding header to an incoming packet, which indicates to network device 400 how to route the packet within the device. Moreover, in an embodiment where network device 400 serves as network device 101, packet classifier 454 can be configured to "mirror" some or all incoming packets, e.g., by modifying the forwarding header, such that a duplicate copy of network traffic is diverted to an indicated port. Alternatively, some or all of the mirroring functionality may be performed in the port group switching logic associated with the egress port(s).

Network device 400 is depicted as also including content addressable memory (CAM) 455. Content addressable memory, such as CAM 455, is a special type of computer memory often used in high-speed searching applications. A CAM is designed in such a way that a data word or data point can be provided to the CAM, and it will return a list of storage addresses. In some embodiments, other similar solutions may be utilized. In the depicted embodiment, CAM 455 is used by a packet classifier 454 to provide lookups based on the content of the packet, e.g., a hash generated from source IP, source port, destination IP, and destination port. CAM 455 will return an index location within PRAM 456, where information on how to forward the packet can be located.

Network device 400 is depicted as also including parameter random access memory (PRAM) 456. PRAM 456, in the depicted embodiment, takes an index returned by CAM 455, and returns information used to forward a packet through network device 400. For example, in one embodiment, a lookup in PRAM 456 may return a forwarding identifier indicating, directly or indirectly, the destination port(s), MAC address of the next hop, virtual local area network (VLAN) data, and/or other forwarding header information required for the completion of the packet forwarding process within network device 400. This information can be used by a packet classifier 454 to build the forwarding header. In some embodiments, after a packet has been forwarded to the egress port group switching logic, the forwarding header is stripped off.

In some embodiments, multicast assist module 457 is included as part of a transmit path. In one such embodiment, multicast assist module 457 provides for replicating packets, e.g., in order to transmit a multicast packet from the same port multiple times with different VLAN IDs. The multicast assist module may include its own VLAN multicast counters, as well as its own VLAN multicast map; these data structures may be programmable by operating system 425. The module is able to automatically manage the transmission of the multicast packet multiple times, each time with the new VLAN ID as specified by the VLAN multicast map.

In the depicted embodiment, interconnect fabric 440 is utilized for passing packets from an incoming port to an egress port. Interconnect fabric 440 interfaces with port group switching logic, e.g., at packet classifier 454 and multicast assist module 457. In one such embodiment, interconnect fabric 440 transfers packets to and from (high-speed) shared memory, e.g., memory 410, or a dedicated high-speed memory included in interconnect fabric 440, such as packet buffer 445. In this embodiment, when interconnect fabric 440 receives a packet from the packet classifier, it transfers the packet to a free location in the shared memory, and retrieves it as appropriate. In some embodiments, it may report information to a buffer manager (not shown), e.g., buffer number, forwarding identifier, or packet priority; the buffer manager makes use of this information, e.g., to determine the location of the packet within the shared memory, manage buffer space, determine the destination(s) of the packet, or identify which queue(s) it should be placed in.

In some embodiments, multiple networking interface modules may be included in the same networking device. In one such embodiment, the interconnect fabric for each networking interface module is coupled to a module crosspoint switching fabric (not shown), which allows packets to pass between networking interface modules. In such embodiments, each interface module can route traffic between ports within that interface module; a packet is only passed to the module crosspoint switching fabric if it is to be routed to a different interface module.

Networking Packets

With reference now to FIG. 5, exemplary networking packets 500 and 550 are depicted, in accordance with one embodiment. While packets 500 and 550 are shown as incorporating specific, enumerated features, elements, and arrangements, it is understood that embodiments are well suited to applications involving additional, fewer, or different features, elements, or arrangements.

Networking packet 500, in the depicted embodiment, is a typical networking packet. It is made up of a header section 510, and a payload section 520. Header 510, in the depicted embodiment, contains information identifying the source, destination, and protocol of packet 500. Header 510 may include information such as source IP 511, source port 513, destination IP 515, destination port 517, and protocol 519; in other embodiments, other information may be included. Payload 520, in the depicted embodiment, contains the data being passed between the source and the destination, e.g., in an HTTP packet, payload 520 may contain some portion of a web page.

When a networking packet, such as packet 500, passes through a networking device, such as network device 400, it is initially processed by a packet processor or packet classifier, e.g., packet classifier 454. This initial processing, which may include examination of the packet headers, e.g., header 510, allows the packet processor to determine how to pass the packet through the network device. In the depicted embodiment, this internal forwarding information is incorporated into a forwarding header 560, which is prepended to packet 500, resulting in packet 550. The network device uses this forwarding header to govern when and how a packet is passed through the internal hardware of the network device. The forwarding header can be stripped off at the outgoing port, allowing the original packet to continue to its next hop.

For example, with reference to FIG. 4, packet 500 is received by network device 400 via physical port 451. Packet 500 passes through media access controller 453, which decodes the packet as necessary, and performs CRC verification. Packet 500 is passed to packet classifier 454. Packet classifier 454 extracts information from header 510, e.g., source IP 511, destination IP 515, and protocol 519, and performs a CAM lookup via CAM 455. CAM 455 returns an index to PRAM 456. Packet classifier 454 retrieves forwarding information from PRAM 456, and uses this information to create forwarding header 560. This forwarding header is prepended to packet 500, as indicated in packet 550. Interconnect fabric 440 uses this forwarding header and/or other in-band or out-of-band control information to determine which port group switching logic, e.g., port group switching logics 450, 460, 470, or 480, is to receive the packet. When packet 550 reaches the egress port group switching logic, forwarding header 560 is used for directing packet 500 to the appropriate egress port. Forwarding header 560 is stripped off of packet 500 before the packet leaves network device 400.

Implementing Load Balancing Across Multiple Monitoring Servers

Figure 6:
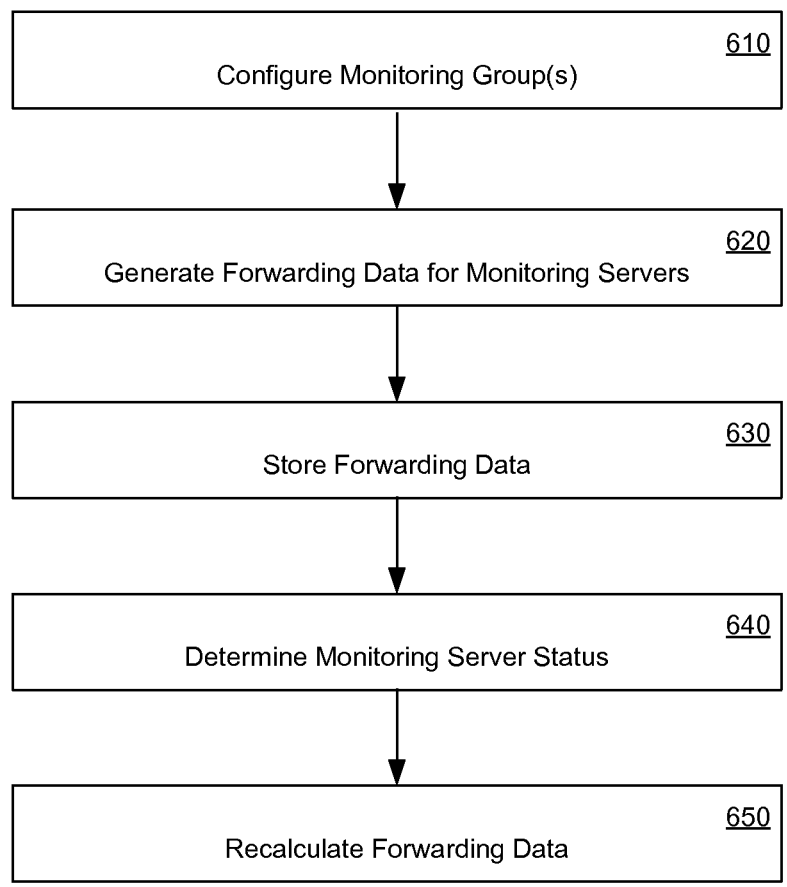
FIG. 6 is a flowchart of a method of implementing hardware load balancing, in accordance with one embodiment.

With reference now to FIG. 6, a flowchart 600 of a method of implementing load balancing across multiple monitoring servers is depicted, in accordance with one embodiment. Although specific steps are disclosed in flowchart 600, such steps are exemplary. That is, embodiments of the present invention are well suited to performing various other (additional) steps or variations of the steps recited in flowchart 600. It is appreciated that the steps in flowchart 600 may be performed in an order different than presented, and that not all of the steps in flowchart 600 may be performed.

The embodiment described herein details a number of steps for configuring a network monitoring device, such as network device 400, to provide load-balancing across multiple monitoring servers in a given network. It is understood that in different embodiments, various steps may be altered or omitted, depending upon the architecture or functionality of the network device being configured. For example, while flowchart 600 describes manipulations of content addressable memory (CAM), another embodiment may interact with another element, e.g., another type of memory, for a network device which does not include content addressable memory.

Moreover, while several embodiments described in conjunction with flowchart 600 discuss load-balancing across multiple intrusion detection system (IDS) servers, it is understood that embodiments are well suited to applications involving different types of monitoring, e.g., virus or spam detection, or bandwidth monitoring.

With reference now to step 610, one or more monitoring groups are configured. In some embodiment, monitoring groups can be utilized to divide network traffic. For example, one monitoring group may be assigned to monitor HTTP traffic, while a second monitoring group handles FTP traffic. These monitoring groups allow for greater granularity in allocating and/or adding monitoring servers. For example, if additional processing power is needed to handle HTTP traffic, a new server can be added to the HTTP monitoring group. In different embodiments, different approaches are utilized for configuring monitoring groups. One such embodiment is described below, with reference to FIG. 7.

With reference now to step 620, forwarding data is generated for the configured monitoring groups and servers, and stored in the network monitoring device. In different embodiments, this step may be implemented in different ways.

In some embodiments, the anticipated range of data is equally divided among the monitoring servers in a given monitoring group. For example, if a monitoring group associated with HTTP traffic contains three monitoring servers, this traffic may be balanced equally across all three servers, e.g., one third of the anticipated networking traffic should be sent to each monitoring server.

In one implementation, information contained in a packet header for a given protocol type is used to generate a hash value. For example, the source IP, source port, destination IP, and destination port are included in a packet header, and can be used to generate a value from a hash function very quickly. All of these possible hash values are known, and can be associated with other information, e.g., internal routing or forwarding information for directing a particular networking packet to a specified monitoring server. In order to obtain an approximately equal division of networking traffic across three monitoring servers, for example, the range of possible hash values can be subdivided so that one third of the possible range will forward traffic to a first monitoring server, one third to a second monitoring server, and one third to the third monitoring server.

In some embodiments, hash value calculation and/or association with monitoring servers is performed by the network monitoring device. For example, the operating system for the network monitoring device may calculate the possible range of hash values corresponding to a particular monitoring group, e.g., a group associated with HTTP traffic.

With reference now to step 630, the forwarding data is stored. In order to ensure that this load-balancing operation is performed quickly, some embodiments utilize a combination of content addressable memory (CAM) and parameter random access memory (PRAM). The hash values are loaded into the CAM, and the internal forwarding information is loaded into PRAM. When a packet is received, the corresponding hash value is calculated from information contained in the packet header. That hash value is passed to the CAM, which returns an index value into PRAM. Internal forwarding information is retrieved from that location in PRAM, e.g., a forwarding identifier, MAC address of the next hop, VLAN ID, as well as any internal forwarding information needed to create the internal forwarding header to pass the packet between the ingress port and the destination port. Practitioners will appreciate, however, that the utility, format, and nature of the internal forwarding information may vary, across different embodiments and/or types of network devices.

As discussed previously, in some embodiments hash value calculation can be performed by the monitoring load balancer, e.g., the operating system for the monitoring load balancer may calculate the possible range of hash values corresponding to a particular monitoring group. The operating system can then load these values into the device's CAM, associated with index values for the PRAM. The operating system can also calculate the range of values that should be associated with each monitoring server in a given monitoring group, and populate the PRAM with the appropriate internal forwarding information.

For example, with reference to FIGS. 1, 4, and 5, assume that monitoring group 120 has three monitoring servers, and is associated with the HTTP protocol. The total possible range of hash values can be loaded into CAM 455, with corresponding index values into PRAM 456. If monitoring servers 121, 123, and 125 are to receive equal shares of the HTTP traffic passing through network device 101, then each monitoring server should be associated with one third of the possible range of hash values. As such, one third of the internal forwarding information stored in PRAM 456 should route HTTP packets to server 121, one third of the internal forwarding information stored in PRAM 456 should route HTTP packets to server 123, and one third of the internal forwarding information stored in PRAM 456 should route HTTP packets to server 125.

With reference now to step 640, the monitoring load balancer may perform a "health check" on a monitoring server, to determine the monitoring server's status. In different embodiments, different degrees of status monitoring may be available. For example, in some embodiments, the monitoring load balancer may notice if a server goes "link dead," such that the connection between the monitoring server and the monitoring load balancer is lost. The monitoring load balancer may also be able to perform additional diagnostics on the monitoring server, e.g., by performing a remote layer 3 or layer 4 "health check."

Further, in some embodiments, the monitoring load balancer may recognize when an additional monitoring server has been added. In some embodiments, such recognition may require additional configuration of the networking device. In other embodiments, the monitoring load balancer may be configured in such a way that it will recognize a particular type of monitoring server upon connection, and assign an appropriate designation and/or associate it with a monitoring group.

For example, with reference to FIG. 1, monitoring load balancer 110 performs periodic health checks on the configured monitoring servers. If monitoring server 123 goes link dead, monitoring load balancer 110 will recognize that event.

With reference now to step 650, forwarding information is recalculated, as necessary. If a monitoring server is added or removed from a monitoring group, the distribution of networking packets should be changed accordingly. As such, the monitoring load balancer can be configured so that if a monitoring server fails a health check, or a new monitoring server is added, the hash values and/or associated internal forwarding information are recalculated, and the new values utilized for handling networking traffic.

For example, with reference to FIGS. 1 and 4, if monitoring server 123 fails a health check, the distribution of HTTP traffic across a monitoring group 120 should change. Accordingly, monitoring load balancer 110 can recalculate the internal forwarding information stored in PRAM 456, such that now one half of HTTP traffic is passed to monitoring server 121, and one half to monitoring server 125. If, at some later time, monitoring server 123 is brought back online, monitoring load balancer 110 can again recalculate the internal forwarding information, and return to forwarding one third of HTTP traffic to each of the three monitoring servers.

An aspect of one embodiment of monitoring load balancer device 110, e.g., network device 400, is that the mirrored traffic received from the network device 101 may be passed between the inputs and outputs of the load balancer device 110 at line rate (e.g., 1 Gig or 10 Gig) using hardware forwarding. As an example using exemplary network device 400, memory in the network device 400, e.g., CAM 455 and PRAM 456, may be pre-loaded with information that allows the network device 400 to output most, if not all, received traffic, in a load balanced manner, to the monitoring server without having to access the microprocessor 420 of the network device 400. Another aspect of such an embodiment is that, if there is a change in the monitoring servers, e.g., a monitoring server goes off-line or comes online, processor 420 of the network device 400, or operating system 425 executing on processor 420, can re-program the CAM 455 and PRAM 456 in real time to re-load-balance the traffic to the monitoring servers.

Configuring a Monitoring Group

Figure 7:
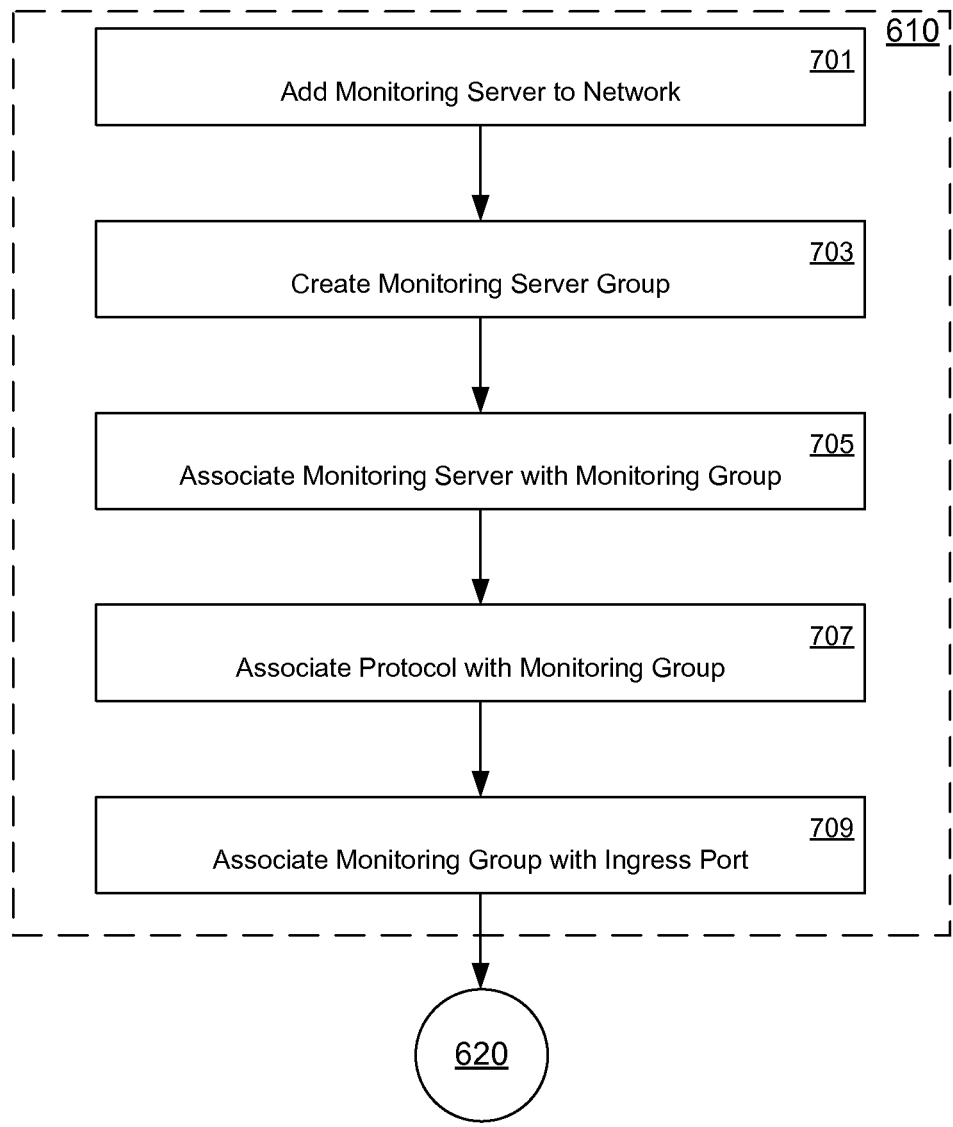
FIG. 7 is a flowchart of a method of configuring a monitoring group, in accordance with one embodiment.

With reference now to FIG. 7, a flowchart 700 of the method of configuring a monitoring group is depicted, in accordance with one embodiment. Although specific steps are disclosed in flowchart 700, such steps are exemplary. That is, embodiments of the present invention are well suited to performing various other (additional) steps or variations of the steps recited in flowchart 700. It is appreciated that the steps in flowchart 700 may be performed in an order different than presented, and that not all of the steps in flowchart 700 may be performed.

In some embodiments, monitoring groups may be utilized in conjunction with the method described in flowchart 600. In one such embodiment, the method described herein with reference to flowchart 700 is used to configure monitoring groups, e.g., step 610 of flowchart 600. In other embodiments, monitoring need not be organized into (protocol) specific groups. In one such embodiment, all traffic is shared proportionately across all available monitoring servers, as opposed to first distributing traffic to specific groups of servers based on protocol, and then distributing protocol traffic across the group's monitoring servers.

With reference to step 701, a monitoring server is added to a network. In some embodiments, when a new monitoring server is added to a network, the monitoring load balancer is made aware of this monitoring server. In one such embodiment, the monitoring load balancer may be able to autodetect the monitoring server. In another embodiment, the monitoring load balancer is configured to be aware of the monitoring server, e.g., by modifying a configuration file used by the operating system of the monitoring load balancer.

TABLE 1

LoadBalancer(config) # server ids-name ids1 192.168.3.1
LoadBalancer(config) # no server ids-name ids1 192.168.3.1

The first configuration line depicted in Table 1 indicates to the monitoring load balancer that a new IDS server, named ids1, can be found at IP address 192.168.3.1. The second configuration line depicted in Table 1 removes server ids1. Alternatively, in some embodiments, a monitoring server may be connected to the monitoring load balancer, and identified by its corresponding physical port, rather than by IP address. An example configuration line utilizing this behavior is presented below, with reference to step 705.

For example, with reference to FIG. 1, a number of monitoring servers 121, 123, 125, 131, 133, 141, and 143 are added to network 100, and connected with network monitoring device 110. Some or all of these servers may be "added" to network monitoring device 110, by executing configuration instructions on networking device 110 to identify some or all of these monitoring servers by IP address.

With reference now to step 703, a monitoring server group is created. In some embodiments, network traffic to the monitor is segregated across groups of monitoring servers, e.g., by networking protocol. In several such embodiments, defining distinct monitoring groups aids in appropriate traffic handling.

TABLE 2

LoadBalancer(config) # server ids-group 1
LoadBalancer(config) # no server ids-group 1

The first configuration line depicted in Table 2 defines a monitoring group, specifically a group for IDS servers, within the monitoring load balancer, and identifies this as group number 1. The second configuration line depicted above deletes monitoring group 1.

Continuing the preceding example, with reference to FIG. 1, monitoring groups 120, 130, and 140 are created. Monitoring load balancer 110 is configured to define each of these groups.

With reference now to step 705, a monitoring server is associated with a monitoring group. In some embodiments, a single server may be associated with multiple groups. Further, in some embodiments, a monitoring group may, and likely will, include multiple monitoring servers. The nature of the monitoring being performed, as well as the anticipated networking load upon the monitoring group, will impact the desired number of monitoring servers included in a monitoring group. For example, an IDS group intended to monitor FTP traffic across a network may require fewer servers than a group intended to monitor HTTP traffic. In some embodiments, monitoring servers are not utilized; in one such embodiment, the monitoring load balancer may be configured to spread the load equally across multiple individual servers. In one default configuration, a single monitoring group is used for all available monitoring servers.

TABLE 3

LoadBalancer(config-ids-1) # ids-name ids1 ids2
LoadBalancer(config-ids-1) # no ids-name ids1 ids2

The first configuration line depicted in Table 3 adds two monitoring servers, ids1 and ids2, to IDS monitoring group 1. The second configuration line removes these monitoring servers from the monitoring group.

TABLE 4

LoadBalancer(config-ids-1) int eth 4/10 eth 4/12
LoadBalancer(config-ids-1) no int eth 4/12

Alternatively, as previously mentioned, monitoring servers can be identified by their corresponding physical ports. The first configuration line depicted in Table 4, for example, adds two monitoring servers, located at ethernet ports 4/10 and 4/12, to IDS monitoring group 1. The second configuration line removes the monitoring server at port 4/12 from IDS monitoring group 1.

In another embodiment, explicit monitoring groups may not be utilized. Instead, when a monitoring server is identified for the monitoring load balancer, a parameter is set, e.g., identifying a networking protocol for that monitoring server. In such an embodiment, multiple monitoring servers may share the same parameters.

Continuing the preceding example, with reference to FIG. 1, monitoring servers 121, 123, and 125 are added to monitoring group 120. Servers 131 and 133 are added to group 130, and servers 141 and 143 are added to group 140.

With reference now to step 707, a protocol is associated with a monitoring group. As noted previously, in some embodiments it is desirable that different monitoring groups handle different portions of networking traffic. In several such embodiments, traffic may be segregated by networking protocol. For example, one monitoring group may be assigned to monitor HTTP traffic, while the second monitoring group monitors FTP traffic, while a third monitoring group is configured to monitor all types of networking traffic. Moreover, multiple groups may be assigned to monitor the same traffic, e.g., to allow for multiple types of traffic monitoring, such as IDS and bandwidth monitoring. In other embodiments, other divisions may be utilized, e.g., by source and/or destination.

TABLE 5

LoadBalancer(config-ids-1) # port http
LoadBalancer(config-ids-2) # port ftp
LoadBalancer(config-ids-3) # port default The first configuration line depicted in Table 5 associates IDS monitoring group 1 with all HTTP network traffic. The second configuration line associates IDS monitoring group 2 with all FTP network traffic. The third configuration line associates IDS monitoring group 3 with all network traffic. In some embodiments, greater weight is given to specifically enumerated protocols, over the "default" parameter. As such, HTTP traffic and FTP traffic will be passed to IDS monitoring groups 1 and 2, respectively, rather than to IDS monitoring group 3. In other embodiments, other approaches to conflict resolution may be utilized.

Continuing the preceding example, with reference to FIG. 1, monitoring group 120 is associated with HTTP traffic, while monitoring group 130 is associated with FTP and telnet traffic. Monitoring group 140 is associated with all other types of networking traffic.

With reference now to step 709, a monitoring group is associated with an ingress port. In some embodiments, a single monitoring group may be associated with multiple ingress ports; similarly, multiple monitoring groups may be associated with a single ingress port. In the former case, a single monitoring load balancer could receive input from multiple monitored networking devices, and distribute the monitor traffic across the same group of monitoring servers. In the latter case, different monitoring groups may need to monitor traffic from the same ingress port, e.g., one monitoring group is associated with HTTP traffic coming in on the specified port, while a second monitoring group watches FTP traffic on that same port.

TABLE 6

LoadBalancer(config-if-e1000-4/1) # ids-group 1
LoadBalancer(config-if-e1000-4/1) # ids-group 2

The first configuration line depicted in Table 6 binds IDS monitoring group 1 to ethernet ingress interface 4/1. The second configuration line binds IDS monitoring group 2 to the same interface.

For example, with reference to FIGS. 1 and 4, Port 451 may be an ingress port from network device 101. Ports 452, 461, and 462 may correspond to monitoring servers 121, 123, and 125, which are included in monitoring group 120. Ports 471 and 472 correspond to monitoring servers 131 and 133, which are in monitoring group 130. Ports 481 and 482 correspond to servers 141 and 143, which are in monitoring group 140. When configuring networking device 400 to act as a monitoring load balancer, groups 120, 130, and 140 are bound to the ingress port, e.g., port 451.

Hash Functions and Forwarding Information

In different embodiments, different approaches may be utilized for determining which traffic should be forwarded to which monitoring server. In some embodiments, a hash function is utilized, with some information from an incoming network packet used to select the appropriate monitoring server. In other embodiment, other approaches may be utilized.

With reference now to FIG. 8, exemplary content addressable memory (CAM) and parameter random access memory (PRAM) entries are depicted, in accordance with one embodiment. It is understood that while FIG. 8 depicts specific, enumerated features, elements, and arrangements, embodiments are well suited to applications involving different, additional, or fewer features, elements, or arrangements.

As shown, CAM 800 contains a number of entries, each conforming to a specified format, e.g., source IP address, destination IP address, source port, destination port, and protocol. Each CAM entry also has an associated index, which serves as a pointer to a location in PRAM 850. In the depicted embodiment, each such location in PRAM 850 provides forwarding information, e.g., to forward a packet from an ingress port to an egress port corresponding to a particular monitoring server. For example, entry 801 contains index 807, which corresponds to PRAM location 857. Forwarding information corresponding to monitoring server 1 is stored at PRAM location 857.

One approach to hashing incoming traffic is to selectively utilize some of the information contained in the packet header. For example, in order to reduce the number of CAM entries required to implement load balancing, it may be desirable to limit the hash value to four bits, for a total of 16 possible values. One way to obtain these four bits is to use only the final two bits from the source IP address and the destination IP address. Over a large range of IP addresses, such as may be expected in a busy network environment, network traffic should be reasonably distributed across these 16 possible values.

In some embodiments, e.g., where monitoring load balancer 110 is a network device such as a switch or router, CAM entries may have a specified format. For example, with reference to FIG. 8, an entry in CAM 800 may include a source IP field, a source port field, a destination IP field, a destination port field, and a protocol field. In order to utilize CAM 800 in conjunction with monitoring server load balancing, the corresponding hash value calculation should result in CAM-compatible entries, such as those depicted in FIG. 8.

For example, entry 801 contains a source IP field 32 bits in length, with only the final two bits specified. Similarly, entry 801 contains a destination IP field of 32 bits, with only the final two bits specified. The combination of these four bits allows for 16 possible hash values, e.g., 0000 to 1111. Further, this approach allows for defined monitoring groups, e.g., by specifying a destination port. For example, HTTP traffic is normally directed to port 80; by specifying a port in entry 801, only HTTP traffic will match that entry, and therefore be directed to the specified index in PRAM 850.

In the embodiment show in FIG. 8, a priority system is in place in CAM 800, such that if a packet matches multiple entries, the index returned corresponds to the entry matched first, e.g., higher in CAM 800. For example, a packet may match in both entry 801, which requires HTTP traffic, and entry 831, which has the same hash values but does not specify a destination port. In this embodiment, index value 807 would be returned, as entry 801 is given a higher priority than entry 831. In this way, the priority for specified protocols associated with monitoring groups over monitoring groups associated with no specific protocol is obtained.

In other embodiments, other approaches may be utilized for capturing and storing hash values. For example, in one embodiment, a more complicated hash function utilized, e.g., using multiple packet header values to calculate a hash value. Some such embodiments may utilize a dedicated module, e.g., an ASIC or FPGA, to perform such a hash calculation at high speed. Other embodiments may utilize additional CAM assets to store greater numbers of hash values. Different embodiments will make different determinations, as to the trade-off between CAM assets and hash value calculation.

Traffic Flow

In networking, the network traffic passed between a particular source and destination can be described as a "flow." In some embodiments, it is desirable that packets corresponding to a particular flow should be sent to the same monitoring server. For example, with reference to FIG. 1, if packets flowing from client computer 198 to server 103 are forwarded to monitoring server 121, those packets flowing from server 103 to client 190 should also be forwarded to monitoring server 121.

In some embodiments, this flow preservation is obtained by careful generation of forwarding information. The hash values corresponding to traffic flowing in one direction are unlikely to be the same as those corresponding to traffic flowing in the other direction. As such, when forwarding information is generated, the forwarding information corresponding to those to hash values should indicate that traffic should be sent to the same monitoring server.

For example, with reference to FIG. 8, entry 811 corresponds to a source IP ending in 00 and a destination IP ending in 01. Traffic matching entry 811 is drafted to monitoring server 2. As such, the converse of this traffic would correspond to a source IP ending in 01, and a destination IP ending in 00, and should also be directed to monitoring server 2, as indicated in entry 821.

Configuring a Load Balancing Network Device

Figure 9:
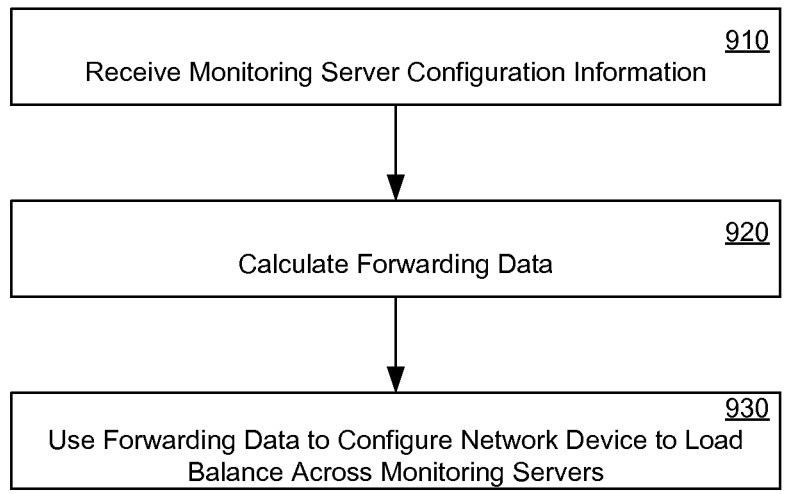
FIG. 9 is a flowchart of a method of configuring a network device, in accordance with one embodiment.

With reference now to FIG. 9, flowchart 900 of a method of configuring a monitoring load balancer is depicted, in accordance with one embodiment. Although specific steps are disclosed in flowchart 900, such steps are exemplary. That is, embodiments of the present invention are well suited to performing various other (additional) steps or variations of the steps recited in flowchart 900. It is appreciated that the steps in flowchart 900 may be performed in an order different than presented, and that not all of the steps in flowchart 900 may be performed.

With reference now to step 910, monitoring server configuration information is received. In some embodiments, this monitoring server configuration information is provided by a user, e.g., by editing a configuration file for the load-balancing network device. In other embodiments, monitoring server information may be obtained in other ways, e.g., through autodetection of available monitoring servers.

With reference now to step 920, forwarding data is calculated, with reference to the monitoring server configuration information. In some embodiments, these calculations performed by an operating system residing on the network device, e.g., operating system 425. As discussed previously, different embodiments may utilize different approaches for calculating forwarding information. For example, hash values for anticipated network traffic may be calculated, and used to allocate network traffic across the available monitoring servers.

With reference now to step 930, the forwarding data is used to configure the network device to load balance across available monitoring servers. In some embodiments, the operating system for the network device uses the forwarding information to configure the network device to allow for hardware load-balancing across monitoring servers. For example, the operating system may populate content addressable memory (CAM) with the calculated hash values, and corresponding index values pointing into parameter random access memory (PRAM). At the indicated locations in PRAM, the operating system may store appropriate forwarding information, e.g., a forwarding identifier, egress port, or similar information, to allow an incoming packet be routed to a particular monitoring server.

Embodiments of the present invention are thus described. While the present invention has been described in particular embodiments, it should be appreciated that the present invention should not be construed as limited by such embodiments, but rather construed according to the following claims.

What is claimed is:

1. A network monitoring device, comprising:
   an ingress port configured to receive network packets, wherein the received network packets are copies of network traffic;
   a plurality of egress ports, each associated with one of a plurality of monitoring servers; and
   a packet classifier coupled to the ingress port;
   wherein a plurality of monitoring groups are configured for the network monitoring device, each monitoring group from the plurality of monitoring groups including one or more monitoring servers from the plurality of monitoring servers, wherein each monitoring group from the plurality of monitoring groups is associated with a networking protocol; and
   wherein the packet classifier is configured to:
     determine that a plurality of network packets from among the received network packets is associated with a particular network protocol;
     determine, based upon the particular network protocol, a particular monitoring group from the plurality of monitoring groups; and
     distribute the plurality of network packets between multiple monitoring servers associated with the particular monitoring group, wherein the distributing includes, for each particular network packet from the plurality of network packets:
       selecting a monitoring server from the multiple monitoring servers based on information included in a header of the particular network packet; and
       forwarding the particular network packet from the network monitoring device using an egress port from the plurality of egress ports that is associated with the selected monitoring server.

2. The network monitoring device of claim 1, wherein the packet classifier is further configured to identify a set of network packets from the received network packets that belong to a same flow, and wherein selecting a monitoring server includes selecting the same monitoring server for the identified set of network packets.

3. The network monitoring device of claim 1, further comprising one or more programmable memories coupled to the packet classifier, the one or more programmable memories storing information used by the packet classifier to forward the particular network packet from the network monitoring device.

4. The network monitoring device of claim 1, wherein the packet classifier is further configured to select the monitoring server from the multiple monitoring servers by generating a hash value from the information provided by the header associated with the particular network packet.

5. The network monitoring device of claim 4, wherein the packet classifier is further configured to select the monitoring server from the multiple monitoring servers by comparing the generated hash value against a range of hash values corresponding to the multiple monitoring servers associated with the particular monitoring group.

6. The network monitoring device of claim 4, wherein a range of hash values is divided into a plurality of sub-ranges, wherein each sub-range is assigned to a monitoring server from the multiple monitoring servers, and wherein the selected monitoring server is associated with a sub-range that includes the generated hash value.

7. The network monitoring device of claim 4, wherein the packet classifier is further configured to select the monitoring server from the multiple monitoring servers by determining that the generated hash values matches a hash value assigned to the selected monitoring server.

8. The network monitoring device of claim 1, wherein the packet classifier is further configured to perform status checks for each of the multiple monitoring servers associated with the particular monitoring group.

9. The network monitoring device of claim 8, wherein the packet classifier is further configured to select the monitoring server from the multiple monitoring server based on results of the status checks.

10. The network monitoring device of claim 1, further comprising a plurality of additional ingress ports configured to receive additional network packets from sources that are different than a source associated with the ingress port, wherein the additional network packets are copies of network traffic.

11. A method comprising:
    determining that each network packet in a plurality of network packets received at an ingress port of a network monitoring device is associated with a particular network protocol, wherein the plurality of network packets are copies of network traffic;
    determining, based upon the particular network protocol, a particular monitoring group from a plurality of monitoring groups configured for the network monitoring device, the plurality of monitoring groups including one or more monitoring servers from a plurality of monitoring servers, the plurality of monitoring servers each being associated with one of a plurality of egress ports included in the network monitoring device, wherein each monitoring group from the plurality of monitoring groups is associated with a network protocol; and
    distributing the plurality of network packets between multiple monitoring servers associated with the particular monitoring group, wherein the distributing includes, for each particular network packet from the plurality of network packets:
      selecting a monitoring server from the multiple monitoring servers based on information included in a header of the particular network packet; and
      forwarding the particular network packet from the network monitoring device using an egress port from the plurality of egress ports that is associated with the selected monitoring server.

12. The method of claim 11, further comprising identifying a set of network packets from the received network packets that belong to a same flow, and wherein selecting a monitoring server includes selecting the same monitoring server for the identified set of network packets.

13. The method of claim 11, wherein forwarding the particular network packet further includes using data stored in one or more programmable memories.

14. The method of claim 11, further comprising:
receiving additional network packets at a plurality of additional ingress ports included by the network monitoring device, wherein the additional ingress ports are configured to receive the additional network packets from sources that are different than a source associated with the ingress port, and wherein the additional network packets are copies of network traffic.

15. The method of claim 11, wherein selecting a monitoring server from the multiple monitoring servers further includes:
generating a hash value using the information included in the header of the particular network packet; and
selecting the monitoring server from the multiple monitoring servers based on comparing the hash value against a range of hash values corresponding to the multiple monitoring servers associated with the particular monitoring group.

16. The method of claim 11, further comprising:
performing status checks for each of the multiple monitoring servers associated with the particular monitoring group.

17. The method of claim 11, further comprising:
configuring a new monitoring group for the network monitoring device, wherein configuring the new monitoring group includes:
associating one or more new monitoring servers from the plurality of monitoring servers with the new monitoring group, wherein the one or more new monitoring servers are each newly associated with an egress port from the plurality of egress ports; and
associating a network protocol with the new monitoring group.

18. The method of claim 11, further comprising:
configuring a new monitoring group for the network monitoring device, wherein configuring includes:
associating one or more monitoring servers from the plurality of monitoring servers with the new monitoring group; and
associating a network protocol with the new monitoring group.

19. The method of claim 18, wherein configuring the new monitoring group further comprises assigning a range of hash values to the one or more monitoring servers associated with the new monitoring group.

20. The method of claim 11, wherein the network monitoring device is further configured with a default monitoring group, the default monitoring group including one or more monitoring servers from the plurality of monitoring servers.

21. The method of claim 20, further comprising:
determining that a second plurality of network packets received at the ingress port of the network monitoring device is associated with a second network protocol, wherein the second plurality of network packets are copies of network traffic;
based upon determining that the second network protocol is not associated with a monitoring group from the plurality of monitoring groups, selecting the default monitoring group; and
distributing the second plurality of network packets between multiple monitoring servers associated with the default monitoring group.

22. The method of claim 15, wherein the range of hash values are divided into a plurality of sub-ranges, wherein each sub-range is assigned to a monitoring server from the multiple monitoring servers, and wherein the selected monitoring server is associated with a sub-range that includes the generated hash value.

23. The method of claim 15, wherein each value from the range of hash values is assigned to a corresponding monitoring server from the multiple monitoring servers, and wherein the generated hash value matches a hash value from the range of hash values that is assigned to the selected monitoring server.

24. The method of claim 16, wherein selecting a monitoring server from the multiple monitoring servers is further based on results of the status checks.

25. A non-transitory computer-readable storage medium storing a plurality of computer-executable instructions executable by one or more processors, the plurality of instructions comprising:
instructions causing at least one processor from the one or more processors to determine that a plurality of network packets received at an ingress port of a network monitoring device is associated with a particular network protocol, wherein the received network packets are copies of network traffic;
instructions causing at least one processor from the one or more processors to determine, based upon the particular network protocol, a particular monitoring group from a plurality of monitoring groups configured for the network monitoring device, the plurality of monitoring groups including one or more monitoring servers from a plurality of monitoring servers, the plurality of monitoring servers each being associated with one of a plurality of egress ports included in the network monitoring device, wherein each monitoring group form the plurality of monitoring groups is associated with a network protocol; and
instructions causing at least one processor from the one or more processors to distribute the plurality of network packets between multiple monitoring servers associated with the particular monitoring group, wherein the distributing includes, for each particular network packet from the plurality of network packets:
selecting a monitoring server from the multiple monitoring servers based on information included in a header of the particular network packet; and
forwarding the particular network packet from the network monitoring device using an egress port from the plurality of egress ports that is associated with the determined selected monitoring server.

* * * * *

UNITED STATES PATENT AND TRADEMARK OFFICE
CERTIFICATE OF CORRECTION

| | |
|---|---|
| PATENT NO. | : 9,270,566 B2 |
| APPLICATION NO. | : 13/584534 |
| DATED | : February 23, 2016 |
| INVENTOR(S) | : Bing Wang and David Cheung |

It is certified that error appears in the above-identified patent and that said Letters Patent is hereby corrected as shown below:

On the Title Page

In Item (73):

Replace "Brocade Communications Systems, Inc., San Jose, CA (US)" with -- Foundry Networks, LLC, San Jose, CA (US) --

Signed and Sealed this
Fifth Day of September, 2017

Joseph Matal
*Performing the Functions and Duties of the*
*Under Secretary of Commerce for Intellectual Property and*
*Director of the United States Patent and Trademark Office*